Dec. 4, 1951 — L. W. ATWATER — 2,577,561
COMBINATION ARMREST AND HEAT SHIELD
Filed Oct. 15, 1947
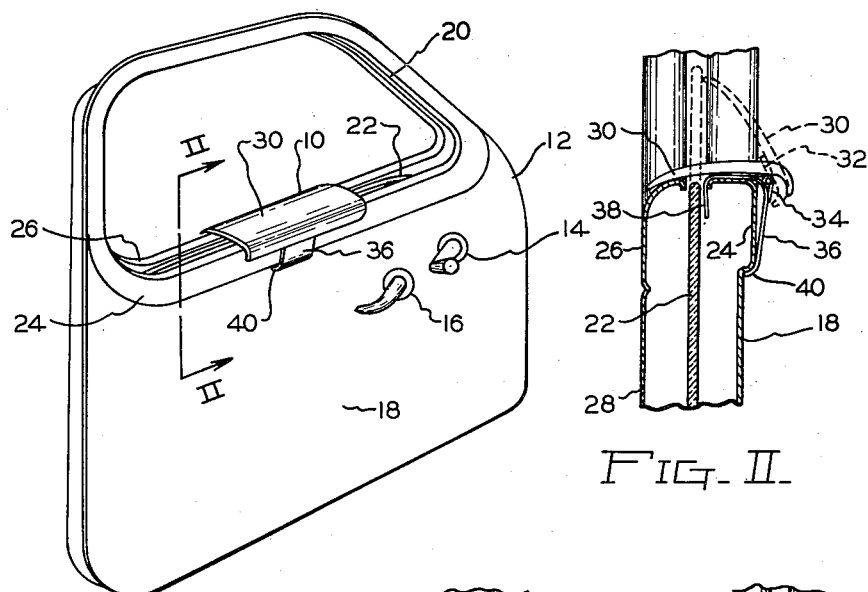
FIG. I.
FIG. II.
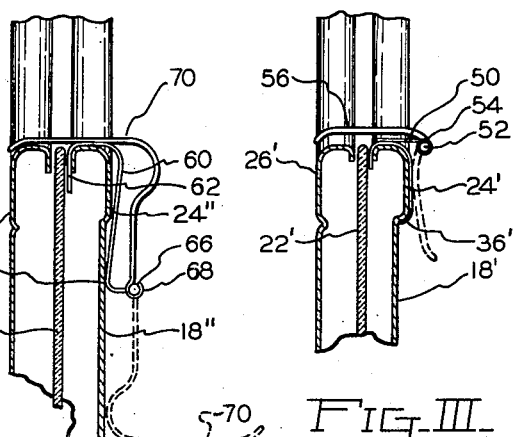
FIG. III.
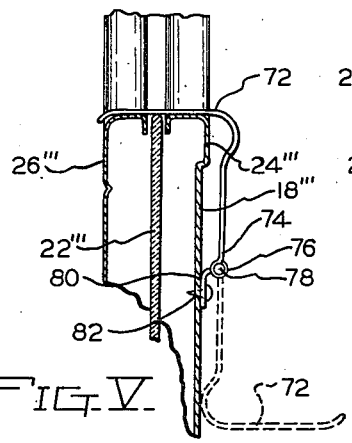
FIG. IV.
FIG. V.
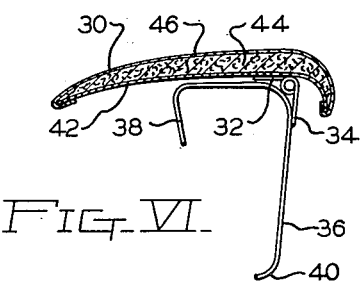
FIG. VI.
Inventor
LEON W. ATWATER
By Beaman & Patch
ATTORNEYS

Patented Dec. 4, 1951

2,577,561

UNITED STATES PATENT OFFICE 2,577,561

COMBINATION ARMREST AND HEAT SHIELD

Leon W. Atwater, Williamston, Mich.

Application October 15, 1947, Serial No. 779,855

1 Claim. (Cl. 296—49.2)

This invention relates to automobile accessories, and more particularly to accessories adapted to be mounted on the window ledge of an automobile door, and functioning to protect the occupant's arm from the heat of the window sill during times when the window sill is exposed to the hot rays of the sun.

Many drivers of automobiles, particularly men, enjoy resting their left arm on the window sill of the lefthand door while driving. This seems to be a physical position which rests the driver, and which makes his left arm immediately available for signalling following cars as to his intentions of stopping or turning. The window sills of automobiles doors are made mostly of metal or other heat absorbing materials, and when exposed to the direct rays of the sun in hot weather, they become too hot to touch. Likewise during this hot weather, most of these drivers do not wear protecting sleeves in their garments, being clad in either a shirt with a long sleeve which is an insufficient protection, or in a shirt with a short sleeve which is no protection at all. In order to protect the arm of the driver who wishes to drive with his arm rested on the window sill, I have therefore provided my combination arm rest and heat shield.

It is therefore an object of this invention to provide an automobile accessory which will protect the arms of occupants against burns from the sun heated window sills of automobiles.

It is also an object of this invention to provide an automobile accessory which will allow the occupants of automobiles to rest their arms on sun heated window sills.

A further object is to provide an arm protecting shield which may be easily attached to and detached from the window sill of the door of an automobile.

Another object is to provide an arm rest and shield which will allow the window in the door to which the accessory has been attached to be closed without removing the accessory.

A further object is to provide an auto accessory which is a combination arm rest and heat shield in one position, and an arm rest alone in another position, A still further object is to provide a combination arm rest and heat shield which may be permanently attached to the car and installed as original equipment.

Other subjects and advantages residing in the particular combination of parts in my invention will be apparent from a consideration of the following specification in connection with the appended claim and the accompanying drawings, in which, Fig. I is a view in perspective of the door of an automobile with the window in its lowered position and my arm rest clipped into position, Fig. II is a view in section on the line II—II of Fig. I, Fig. III is a view similar to Fig. II of a modification of the arm rest and shield of Fig. II, Fig. IV is a view similar to Figs II and III, but showing an arm rest and shield which acts also as an inside arm rest in its secondary position, Fig. V is a view similar to Fig. IV, but showing a different type of mounting structure, and Fig. VI is a view in cross section of the shield of Fig. II showing the internal heat resisting structure of the shield.

In the drawings, the shield 10 is shown mounted on a door 12 which has the usual window operating handle 14 and the door operating handle 16 appearing against the inside upholstered panel 18. The opening 20 which is normally filled by the window glass 22 is surrounded on the inside by the window moulding 24 and on the outside by the moulding 26 which is oftentimes merely a continuation of the outside door panel 28. The shield 10 shown in Figs. I and II comprises essentially a protecting portion 30 which carries a hinge block 32 mounted to cooperate with the hinge block 34 which is attached to the U-shaped clip member 36. The clip 36 has an inner lip 38 which normally is inserted in the space between the window glass 22 and the moulding 24, and a somewhat longer hooked portion 40 of a shape and size to engage the lower edge of the moulding 24 to hold the clip 36 in its mounted position. It will be immediately appreciated that with this construction, the window glass 22 may be raised as shown in dotted outline in Fig. II, and that when the glass 22 is raised the protecting portion 30 of the shield will be pushed up out of the way to allow the glass to pass, and that it will not be necessary to remove the shield 10 from the door 12 prior to raising the glass 22.

As shown in Fig. VI, and as intended in all embodiments of my invention, I provide a curved metal plate 42 to be employed as the part on which the hinge block 32 is mounted to carry the entire structure on the window sill. The internal padding 44 overlays the entire plate 42, and the entire portion 30 is encased in the upholstered or fabric cover 46. This type of construction will give the proper rigidity to the structure, and will at the same time provide a surface which will not absorb a high degree of heat from the sun's rays and transmit this to the arm of the occupant.

In Fig. III is shown a variation of my invention, in which the metal clip 36' embraces the inner moulding 24', and supports a hinge block 50 which is pinned as at 52 to the one edge 54 of the shield 56. The advantage to be found in this particular construction is that when the shield 56 is not in use, it may be rotated about the pin 52 into the position shown in dotted outline in Fig. III, in which position it is completely out of the way of the driver.

The modification shown in Fig. IV utilizes the mounting clip 60 with its one lip 62 which fits between the window glass 22" and the inner window moulding 24" and the other end of which rests against the inner upholstered panel 18" as at 64. The lower end of the clip 60, near the portion 64 extends out away from the panel 18" and presents a hinge portion as at 66 with which the hinge portion 68 cooperates to hold the shield 70 in either the protecting position over the window sill, or in the inner arm rest position as shown in dotted line in Fig. IV. In this embodiment, the protecting portion 70 is utilized as a heat shield and also as an inner arm rest, and the cliptype mounting makes the accessory easily removable from the automobile.

In Fig. V is shown a still further variation of my arm rest and heat shield in which the protecting panel 72 is formed to cover the inner window moulding 24''' in the outer window moulding 26''', and presents at its lower end 74 a hinged portion 76 adapted to cooperate with the hinge portion 78 on the bracket 80 which is secured to the inner upholstered panel 18''' as by the screw 82. This particular mounting of the combination heat shield and arm rest has as its advantage the fact that the accessory is permanently attached to the automobile and is not likely to be lost or mislaid and therefore unavailable when its use is desired.

It will be apparent to those skilled in the art from the above that I have provided an automobile accessory which will protect the arm of the occupant from being burned from sun heated metal window sills, and which will allow the driver or occupant to sit in the automobile with his arm over the window sill. I have provided likewise several different methods of mounting this arm rest and heat shield to accommodate the wishes of different motorists.

Having thus described my invention, what I claim as new and desire to protect by Letters Patent is:

A combination heat shield and arm rest for detachable association with the window sill of an automobile having a vertically slidable window pane operating in a centrally located slot in the sill, comprising a clip for embracing the inner portion of the sill with one portion of the clip depending into the slot adjacent the window pane, a padded rigid plate member, a hinge connection between the under side of said plate member and a part of said clip horizontally displaced with reference to said depending portion to be located at the inside edge of the sill, said plate member having a portion extending from said hinge connection away from the slot to overlie said clip and hinge connection, another portion of said plate member extending from said hinge connection across the slot to overlie the sill, said plate member hinging about said connection when the window pane is raised in the slot to dispose said plate member to the side of the window pane.

LEON W. ATWATER.

REFERENCES CITED

The following references are of record in the file of this patent:

UNITED STATES PATENTS

| Number | Name | Date |
| --- | --- | --- |
| 1,674,205 | Johnson | June 19, 1928 |
| 1,898,008 | Fox | Feb. 21, 1933 |
| 1,902,730 | Shaw | Mar. 21, 1933 |
| 1,962,508 | Josselyn | June 12, 1934 |
| 2,274,026 | Allen | Feb. 24, 1942 |